J. Lusk.
Fodder Cutter.

No. 87,573. Patented Mar. 9, 1869.

Witnesses: Inventor:
C. H. Cook Jason Lusk
John Stewart

United States Patent Office.

JASON LUSK, OF FREDONIA, MICHIGAN.

Letters Patent No. 87,573, dated March 9, 1869.

IMPROVEMENT IN MACHINE FOR GRATING FODDER.

The Schedule referred to in these Letters Patent and making part of the same.

*To all whom it may concern:*

Be it known that I, JASON LUSK, of the town of Fredonia, in the county of Calhoun, and State of Michigan, have invented a new and useful Machine for Grating and Scarifying Dry Fodder, of any description, after it has been cut up; and I do hereby declare that the following is a full, clear, and exact description of the same, reference being had to the annexed drawings, making a part of this specification, in which—

Similar letters of reference indicate like parts in the several figures.

Figure 1:
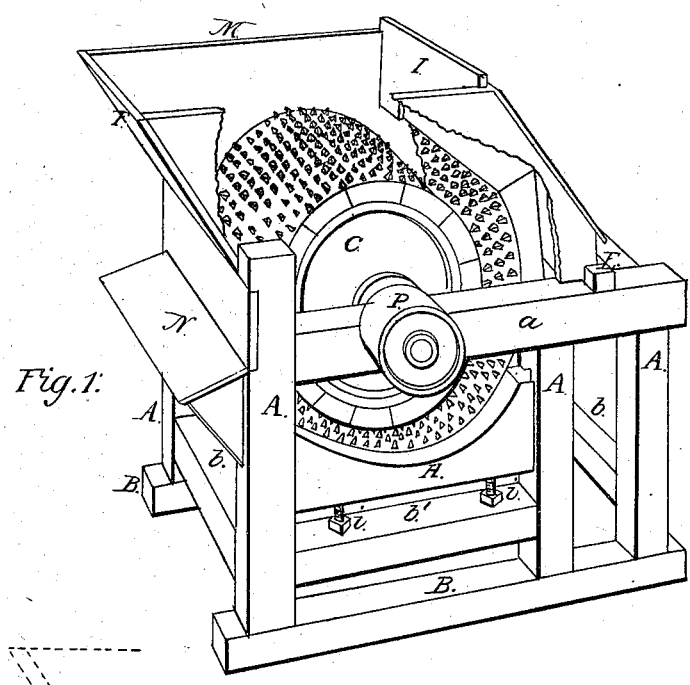
Figure 1 is a perspective view.
Figure 2:
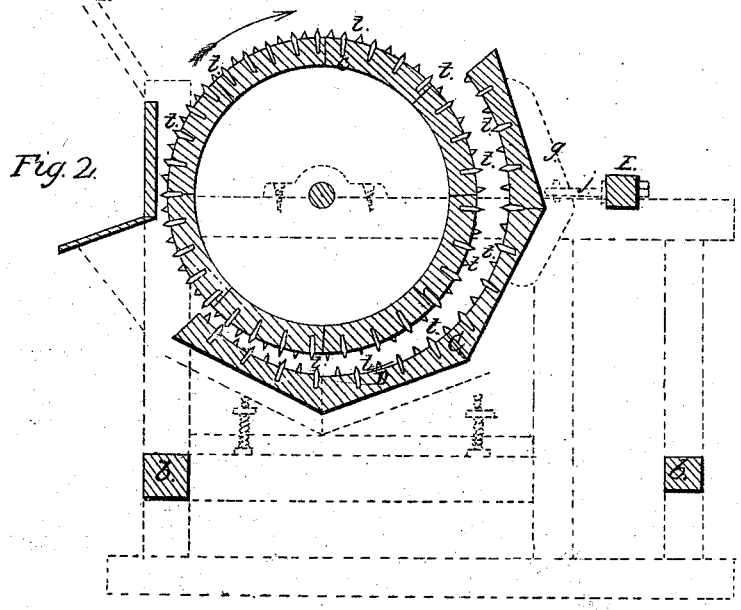
Figure 2 is a longitudinal vertical section.

The nature of my invention consists in passing cut fodder between a swiftly-revolving cylinder and a stationary concave, both of which are furnished with teeth, closely set together, and having pyramidal points, the several parts constituting the machine being arranged and adjusted as hereinafter described; and the better to enable others skilled in agricultural mechanism to construct my invention, I will proceed to describe it.

A a represent, respectively, the posts and rails, and B b, the sills and girts of the frame of my machine, within which the grating and slitting-cylinder C and the concave D are hung, substantially in the manner of a threshing-machine, with these exceptions, that the teeth of the cylinder and concave do not overlap each other in my machine, and the cylinder's motion, (as shown by the arrow,) is from the feeding-board, instead of toward it.

I hang my concave within the frame in such manner that it may be adjusted more or less eccentrically with the cylinder; that is to say, while the lower section of the concave, at the discharge-line, is so adjusted in relation with the cylinder, that the points of the teeth of each nearly touch each other, the upper or receiving-line may be caused to diverge, more or less, so that the fodder, as it is drawn in, may pass through a space proportioned to its nature and bulk, and which gradually narrows toward the discharge.

The concave is sustained and adjusted vertically, upon hangers, H, which slide between the frame-posts; the adjustment being effected by set-bolts, $i$, the heads of which abut on top of the girts marked $b^o$, and the upper portion of the curve is adjusted and held horizontally by the two adjusting-bolts $j$, (see dotted lines,) in the cross-bar E, which bolts screw into nuts, let in the cleats $g$, which connect the upper sections of the concave together.

A detachable panel, (not shown,) having a curved lining-piece, to fill the space above the hangers, and enclose the concave laterally, is fitted in on each side between the posts, when the machine is at work.

The cylindrical surface of the cylinder is covered with sheet-iron, after being turned true in a lathe, being built up usually of thick staves, properly secured to cast-heads, keyed on the shaft.

The concave is also built in sections, and covered with sheet-iron, before the insertion of the teeth $t$, which I will now describe.

I usually construct the teeth of both cylinder and concave alike, of steel, with slightly-taper shanks, driven firmly into the wood. The projecting points are shaped like a four-sided pyramid, with sharp apex and angles, the sides standing parallel, and at a right angle with the cylinder's axis.

I do not set these teeth in rows around the periphery, but distribute them sufficiently close together, and in such manner, over both cylinder and concave, as will drive the cut fodder through in a tortuous or zigzag course, best calculated to scarify, scratch, slit, and abrade the hard and stiff exterior of the cut fodder, which is the object principally in view.

F represents the feed-board of the hopper M, the front side of which is shown as broken away, to exhibit the cylinder, and I is a gate, sliding in the hopper-sides, to gauge the supply to the concave.

My grating-machine may be used as a separate machine, the fodder being first cut short, and then shovelled into the hopper; or the fodder, as it is cut in a cutting-box, may be conveyed to it upon an endless apron; or, better still, the grating-machine may be so combined with a feed-cutter, that by a proper arrangement of the planes of level and transmission of power, the fodder, as it is cut, may fall into the hopper of the grater, and thus effect the cutting and grating in one continuous operation.

When the cylinder C is rapidly revolved in the direction of the arrow, by means of a belt passing over the pulley P, or by gears, driven by any suitable power, and the cut fodder is fed into the hopper, it is drawn by the cylinder-teeth, as fast as may be desired, under the gate I, and through, in a zigzag direction, the gradually-decreasing space between the cylinder and concave, and is ejected against the deflecting-board N, and deflected to the floor, in a limp, spongy condition, and entirely free from dust, having been thoroughly winnowed in the strong air-current, produced by the rapid motion of the cylinder.

Should any hard, foreign body, calculated to injure the machine, accidentally fall with the fodder on the cylinder, when in full speed, it will be ejected, in a nearly vertical tangential line, without injury to the machine or operator.

The necessity and advantage of grating and slitting or scarifying fodder, after it is cut, and before it is eaten by animals, arise from the fact that dry fodder, especially corn-stalk, has a hard and stiff exterior, and when simply cut short, as usual, the cut ends operate like knife-blades, and so irritate the gums of animals that they soon reject the sharp-pointed pieces, especially those near the but, which contain the largest quantity of nutritive matter.

I know that machines, which operate by a crushing or bruising action, have been unsuccessfully used to remove the hard, glassy exterior of cut fodder, and so soften it as to fit it for use; but crushing it does not blunt the cut ends, which is the main object to be accomplished.

My pyramidal-pointed steel teeth $i$ operate in an entirely different manner upon cut fodder. The sharp apex-points scarify and slit the harsh, wiry stems, and the smooth, hard exterior and sharp-cut ends, are thoroughly abraded and blunted in the zigzag course, among the sharp cutting and grating angles of the teeth, as aforesaid.

The action of my cylinder and concave teeth, being of a cutting and scraping nature, instead of a crushing or bruising one, the cylinder may be run at a high speed, with less expenditure of power.

I am aware that machines for cutting and crushing corn-fodder have been used, in which the fodder is passed between a rotary toothed cylinder and a toothed concave, and is cut and crushed by the action of the teeth, which are made to interlock with each other, the concave being continually pressed against the cylinder by weighted levers; but I disclaim all such machines, in which the teeth of the concave interlock with those of the cylinder, as, by such interlocking, a result is produced entirely contrary to that which I have aimed to secure.

What I claim as my invention, and desire to secure by Letters Patent, is this:

The toothed concave D, eccentrically adjustable by means of the screws $i$ and $j$, when so arranged, with relation to the toothed cylinder C, that said toothed surfaces are removed from contact with each other, and a clear space is formed, gradually tapering, between them, whereby the fodder is not cut and crushed, but relieved of its hard covering and ends, as and for the purpose herein shown and described.

JASON LUSK.

Witnesses:
  C. H. COOK,
  JOHN STEWART.